United States Patent [19]

Maus

[11] Patent Number: 4,713,361

[45] Date of Patent: Dec. 15, 1987

[54] METALLIC CATALYST BODY HAVING THERMAL RADIATION PROTECTION

[75] Inventor: Wolfgang Maus, Bergisch Gladbach, Fed. Rep. of Germany

[73] Assignee: Interatom GmbH, Bergisch Gladbach, Fed. Rep. of Germany

[21] Appl. No.: 3,558

[22] Filed: Jan. 15, 1987

[30] Foreign Application Priority Data

Jan. 15, 1986 [DE] Fed. Rep. of Germany ....... 3601011

[51] Int. Cl.$^4$ .............................................. B01J 35/04
[52] U.S. Cl. ...................................... 502/2; 502/439; 502/527; 428/593
[58] Field of Search ........................... 502/439, 527, 2; 428/116, 593

[56] References Cited

U.S. PATENT DOCUMENTS 4,196,099 4/1980 Hunter et al. ................. 502/527 X
4,433,064 2/1981 Pienon ................................ 502/527

FOREIGN PATENT DOCUMENTS 0049489 1/1981 European Pat. Off. .
60-197242 10/1985 Japan ................................... 502/527

Primary Examiner—W. J. Shine
Attorney, Agent, or Firm—Herbert L. Lerner; Laurence A. Greenberg

[57] ABSTRACT

A metallic catalyst body includes a casing, and a metallic honeycomb structure having layers disposed within the casing, the metallic honeycomb structure having at least one other layer disposed outside the casing as thermal radiation protection.

10 Claims, 1 Drawing Figure

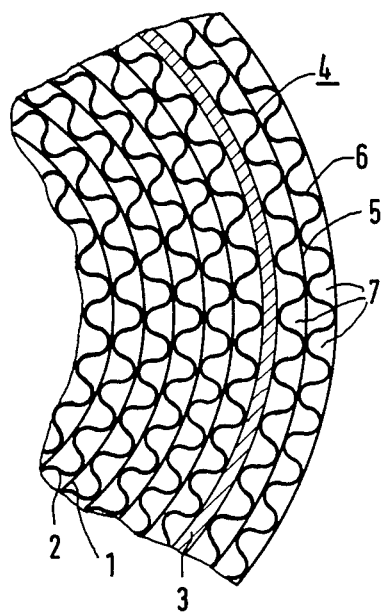

METALLIC CATALYST BODY HAVING THERMAL RADIATION PROTECTION

The invention relates to a metallic catalyst body, especially for internal combustion engines, wherein the catalyst body has a metallic honeycomb structure and a casing.

Catalyst bodies of this kind are known, for instance, from European Pat. No. 00 49 489. Such catalyst bodies have one property that is particularly favorable for the functioning thereof, namely good thermal conductivity of the structure thereof as compared with ceramic honeycomb bodies. Since they are furthermore very sturdy mechanically, they do not need to be disposed in special cushioning when they are used in motor vehicles. However, these fundamental advantages mean that in certain operating states the casing of such a catalyst body may become quite hot and therefore it may give off heat in the form of thermal radiation. When the catalyst body is disposed underneath the floorboard of a motor vehicle, heat transfer by thermal radiation to other parts in the vicinity may be undesirable.

It is accordingly an object of the invention to provide a metallic catalyst body having thermal radiation protection, which overcomes the hereinafore-mentioned disadvantages of the heretofore-known devices of this general type and which reduces the thermal radiation as compared to other metallic catalyst bodies.

With the forgoing and other objects in view there is provided, in accordance with the invention, a metallic catalyst body, especially for internal combustion engines, comprising a casing, and a metallic honeycomb structure having layers disposed within the casing, the metallic honeycomb structure having at least one other layer disposed outside the casing as thermal radiation protection.

Instead of a protective coating of ceramic fiber material or the like, which is expensive both in terms of production and assembly, the invention merely provides that one additional metallic honeycomb metal structure is disposed outside the casing as well. The usual construction of a catalyst system provides that the casing of the catalyst body be welded or otherwise joined at its end to transitional pieces and inserted into the exhaust system of a motor vehicle. The honeycomb structure serving as thermal radiation protection accordingly does not experience a flow therethrough of exhaust gas, nor do any exothermic reactions take place there, regardless of whether or not this outer honeycomb structure is coated with catalytically active material. Due to its multilayered construction, the honeycomb structure outside the casing provides very effective protection against the thermal radiation of the casing.

In accordance with another feature of the invention, the layers of the honeycomb structure are alternating layers of smooth and corrugated metal sheets, and the at least one other layer disposed outside the casing is in the form of from one to five and preferably two layers each having one smooth and one corrugated metal sheet. It is known to produce catalyst bodies from layered or spirally wound smooth and corrugated metal sheets and to place them in a casing. By adding some outer layers as thermal radiation protection, the production process is only very slightly changed and the materials that are already at hand can be used.

In accordance with a further feature of the invention, the layers of the honeycomb structure outside and inside the casing are joined to the casing and to one another by a joining technique, preferably by brazing. The addition of an additional layer as thermal radiation protection does not require an additional joining step, because the outer and inner layers can be soldered to one another in one operation, for instance in a soldering oven.

In accordance with an added feature of the invention, the at least one other layer of the honeycomb structure outside the casing define channels for receiving an ambient air flow therethrough as thermal radiation protection. When a catalyst body according to the invention is disposed under a motor vehicle, it is automatically possible to receive ambient air in the channels as long as the catalyst body is disposed in such a way that the channels extend approximately in the direction of travel of the vehicle. In that case, the outer honeycomb structure is cooled, which even further decreases the output of thermal radiation.

In accordance with an additional feature of the invention, the at least one other layer serving as thermal radiation protection surrounds only part of the catalyst body in circumferential direction.

In accordance with yet another feature of the invention, the catalyst body has a given portion thereof located at the top after installation, and the at least one other layer serving as thermal radiation protection surrounds only the given portion in circumferential direction.

In accordance with yet a further feature of the invention, the at least one other layer outside the casing is in the form of a smooth metal sheet.

In accordance with a concomitant feature of the invention, the at least one other layer outside the casing is in the form of a corrugated metal sheet.

Other features which are considered as characteristic for the invention are set forth in the appended claims.

Although the invention is illustrated and described herein as embodied in a metallic catalyst body having thermal radiation protection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single figure of the drawing.

BRIEF DESCRIPTION OF THE DRAWING

The single FIGURE of the drawing is a fragmentary, diagrammatic, cross-sectional view of a preferred embodiment of the invention.

Referring now to the figure of the drawing in detail, there is seen a portion of a cross section of a metallic catalyst body according to the invention having thermal radiation protection. The catalyst body itself is spirally wound from alternating layers of smooth or planar sheets 1 and corrugated or wavy sheets 2 of highly temperature-proof steel. A casing or tubular shell 3 surrounds the catalytically active portion of the catalyst body. At least the sheets 1, 2 in the interior of the casing 3 can be or are coated with a catalytically active material. Further layers of smooth sheets 5 and corrugated or wavy sheets 6 are provided outside the casing 3, forming channels 7 through which the ambient air can flow. In principle, the same kind of material can be used for the outer and inner honeycomb structures, but it is also possible for less expensive material to be used for the thermal radiation protection, because extreme temperatures and stresses from corrosion or erosion do not arise there. Furthermore, the decision as to how many layers of honeycomb structure are needed for effective thermal radiation protection depends on the individual case. Depending on requirements, the outer layer may also be a smooth sheet or a corrugated sheet.

The embodiment according to the invention provides another advantageous effect, as long as the outer insulation is constructed only for thermal radiation protection and not for cooling. In such a case, the casing assumes a higher temperature during operation than when there is no thermal radiation protection. The temperature difference between the interior of the catalyst body and the casing thus becomes less than it would be without thermal radiation protection, which simultaneously lessens the thermal strain on the honeycomb structure as a whole. On the other hand, thermal radiation protection which is disposed on the interior of the casing, such as that known from the prior art, would increase the temperature difference and hence the alternating thermal strains. As already mentioned above, the prerequisite for this effect is for the outer layers to not function as cooling fins so that they therefore do not have ambient air flowing through them, but instead serve only for thermal radiation protection. To this end, it is necessary to provide a closure of the channels located outside the casing, such as by crimping the ends shut, providing a protective collar, or the like.

Accordingly, the construction of a metallic catalyst body according to the invention serves to lessen the alternating thermal strains in the interior thereof and to lower the outside temperature thereof. This facilitates the installation the catalyst body underneath the floorboard of a motor vehicle while avoiding the transmission of high temperatures to parts in the vicinity.

I claim:

1. Metallic catalyst body, comprising a casing, and a metallic honeycomb structure having layers disposed within said casing, said metallic honeycomb structure having at least one other layer disposed outside said casing as thermal radiation protection.

2. Catalyst body according to claim 1, wherein said layers of said honeycomb structure are alternating layers of smooth and corrugated metal sheets, and said at least one other layer disposed outside said casing is in the form of from one to five layers each having one smooth and one corrugated metal sheet.

3. Catalyst body according to claim 1, wherein said layers of said honeycomb structure are alternating layers of smooth and corrugated metal sheets, and said at least one other layer disposed outside said casing is in the form of two layers each having one smooth and one corrugated metal sheet.

4. Catalyst body according to claim 1, wherein said layers of said honeycomb structure outside and inside said casing are joined to said casing and to one another.

5. Catalyst body according to claim 1, wherein said layers of said honeycomb structure outside and inside said casing are joined to said casing and to one another by brazing.

6. Catalyst body according to claim 1, wherein said at least one other layer of said honeycomb structure outside said casing define channels for receiving an ambient air flow therethrough as thermal radiation protection.

7. Catalyst body according to claim 1, wherein said at least one other layer serving as thermal radiation protection surrounds only part of the catalyst body in circumferential direction.

8. Catalyst body according to claim 1, wherein the catalyst body has a given portion thereof located at the top after installation, and said at least one other layer serving as thermal radiation protection surrounds only the given portion in circumferential direction.

9. Catalyst body according to claim 1, wherein said at least one other layer outside said casing is in the form of a smooth metal sheet.

10. Catalyst body according to claim 1, wherein said at least one other layer outside said casing is in the form of a corrugated metal sheet.

* * * * *